Patented Nov. 1, 1932

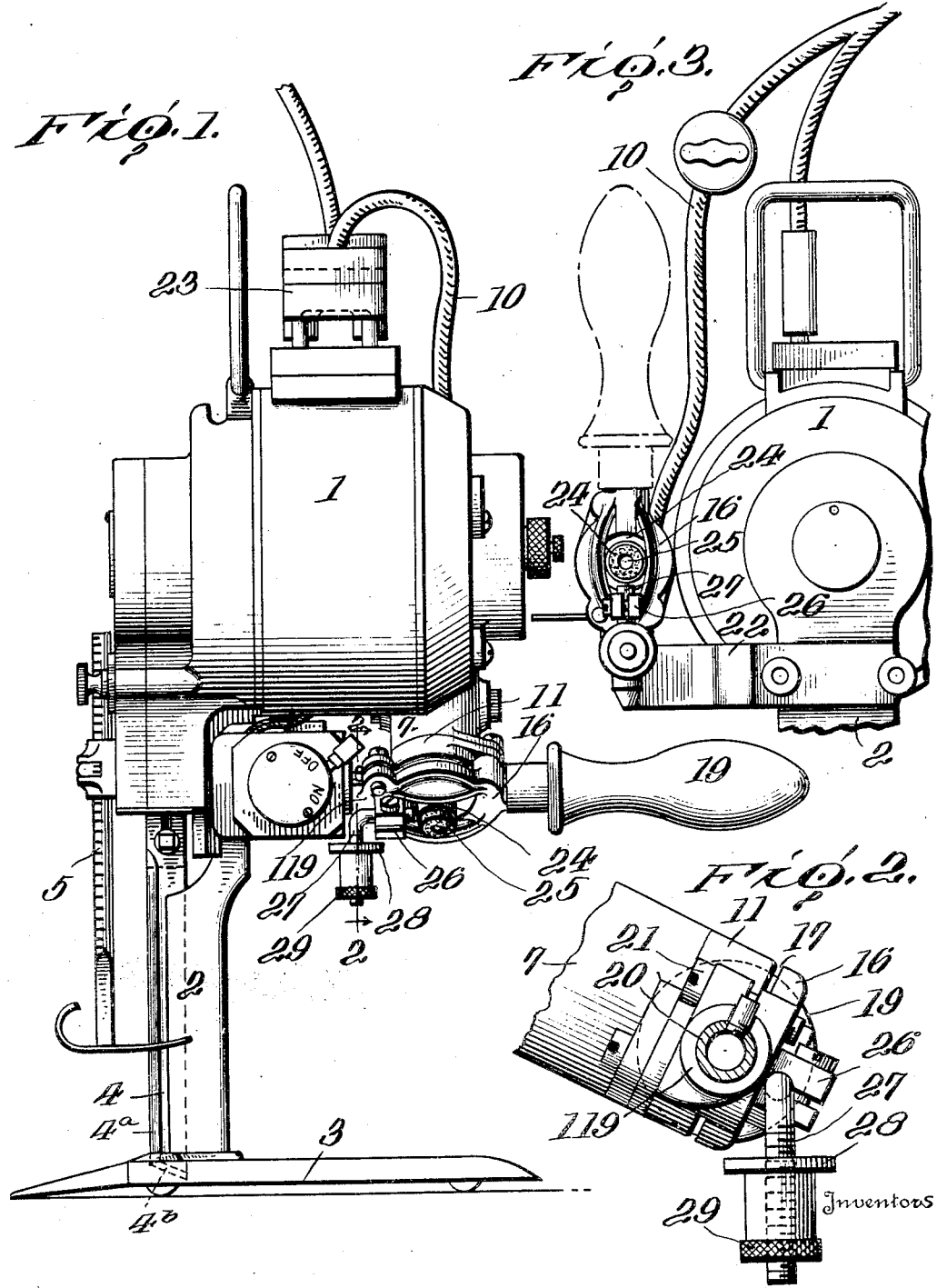

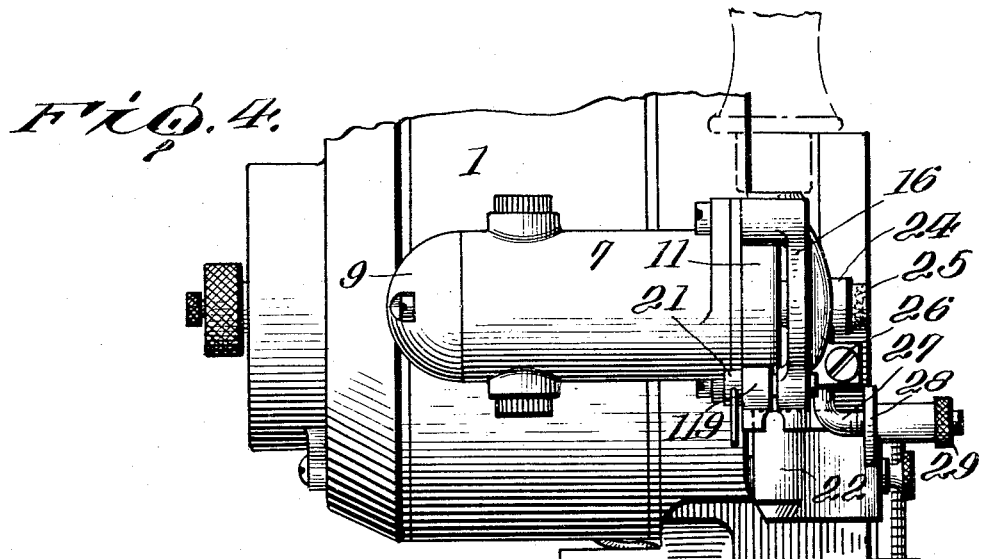
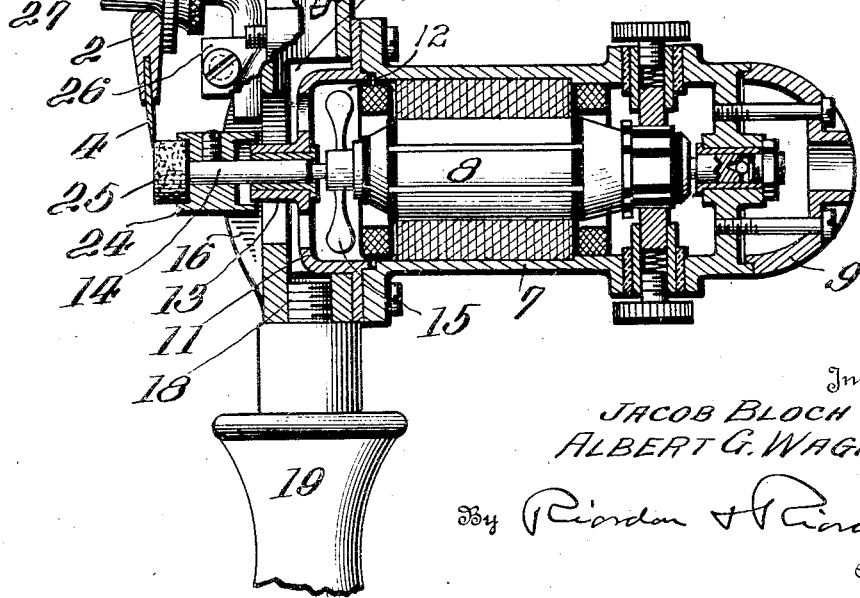

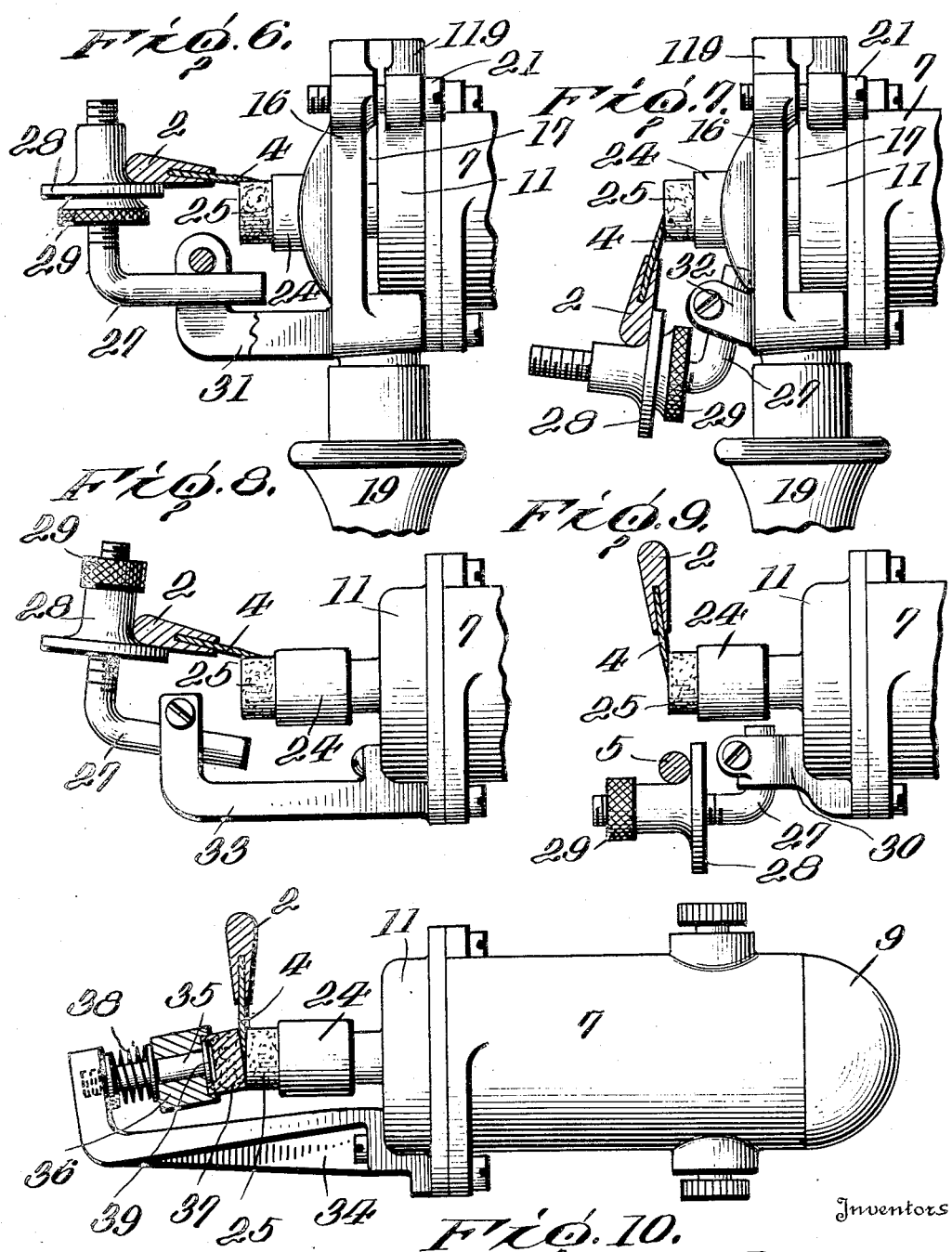

1,886,077

UNITED STATES PATENT OFFICE

JACOB BLOCH AND ALBERT G. WAGNER, OF CINCINNATI, OHIO, ASSIGNORS, BY DIRECT AND MESNE ASSIGNMENTS, TO THE WOLF MACHINE COMPANY, OF CINCINNATI, OHIO, A CORPORATION OF OHIO

CLOTH CUTTING MACHINE

Application filed September 8, 1927. Serial No. 218,307.

The primary object of this invention is to provide a simple and highly efficient device for sharpening the reciprocatory knives of cloth-cutting machines.

The most general practice, at present, is to use a hand stone in stick form but this practice results in an irregular cutting edge, consumes time and causes damage to the standard or cutting machine support, in which the knife operates.

Another object of the invention, therefore, is to provide a device which may be applied to the knife without damage to the standard and which will quickly produce an even sharp edge.

The knives on these cutting machines usually have in addition to the vertical cutting edge, a substantially horizontal or tapered edge across the bottom of the knife, in a line substantially perpendicular to the main cutting edge. It has been found in practice heretofore, that unless a hand stone, as above referred to, is used, that this bottom edge can not feasibly be sharpened.

Accordingly, another object of this invention is to provide a device by means of which the bottom cutting edge of a cloth cutter knife may be sharpened.

These objects and other objects which will incidentally appear in the course of the following description are attained in such devices as are illustrated in the accompanying drawings and the invention resides in certain novel features which will be particularly pointed out in the appended claims.

In the drawings:—

Fig. 1 is an elevation of a cloth-cutting machine having a device embodying the invention mounted thereon;

Fig. 2 is a detail section on the line 2—2 of Fig. 1;

Fig. 3 is a view showing a slightly different manner of mounting the sharpener or grinder on the cloth-cutting machine;

Fig. 4 is a side elevation of the arrangement shown in Fig. 3;

Fig. 5 is a longitudinal section of the sharpener showing one mode of applying the same;

Figs. 6 to 10 are detail elevations showing various modifications in the form of the device or the manner of using it.

In the drawings, there is shown a cloth-cutting machine including a casing 1 housing an electric motor and supported by a standard 2 rising from a base 3, which in use, passes under the pile of cloth to be cut. A knife 4 having a vertical cutting edge 4a, and bottom cutting edge 4b is driven by the motor and reciprocates in a guideway provided therefor in the standard, and a presser bar 5 is mounted adjacent the standard to hold the pile of cloth firm under the action of the knife. The machine is usually provided with a handle, as at 6, whereby it may be guided and held to the work.

In carrying out the present invention, there is provided a cylindrical casing 7 containing an electric motor 8 and including a cap 9 at one end through which a current-conducting cable 10 may pass to the motor, while at the opposite end of the casing is secured a cap 11 having air openings 12 therethrough and provided with a central bearing 13 for an extension 14 of the motor shaft, a fan 15 being secured on the shaft within the cap 11 to play on the motor and prevent overheating of the same. Secured over the cap by the same bolts which secure the cap to the casing is a yoke or frame member 16 which is so shaped as to span the cap and provide an ample space 17 for the circulation of air. On one end of the yoke or frame 16 is formed a threaded socket 18 whereby a handle 19 may be attached, and at the opposite end there is formed a split collar 119 which is adapted to embrace a lug 20, usually provided on the back of the cloth-cutting machine as a means of attachment for the handle 6, and be clamped thereon by a bolt 21 inserted through lugs on the sides of the split. In this manner, when not in use the tool is mounted on the cloth cutter so that it is available whenever sharpening of the knife is advisable but does not interfere with the use of the cutter. Indeed, the sharpener may be utilized as a handle for the cutter and the usual handle 6 removed. When used in this manner, as a handle for the cutting machine, it will be noted, that as the portable grinder is attached to the lug to which the handle 6 is conveniently attached, and by means of the socket 119 which is located at right angles to the casing 7, the handle 19 of the grinder is positioned exactly as the handle 6 had been formerly placed.

With some types of cutters, it may be necessary or desirable to secure a bracket, as 22, upon the casing 1 to furnish a support for the grinder, but it is intended that the grinder be mounted on the cutter so that it will always be accessible when needed. When the grinder is to be used it is, of course, removed from the cutter and the cable 10 is plugged into an electric circuit, and when it is not in use the plug 23 may be engaged in two holes provided in the top of the casing 1 so as to be held out of the way. The cable 10 may, however, be tapped into the circuit of the motor for the cloth cutter, as indicated in Fig. 3.

When the grinder is mounted on the cutter as shown in Figs. 3 and 4, the handle 19, may be removed therefrom and interchangeably utilized as the cutter handle, thus entirely dispensing with the handle 6.

It may be desirable to dispense with both handles 6 and 19, and in this event, the casing 7, upon being mounted properly on the lug 20, may be grasped and used as the cutter handle.

On the end of the motor shaft extension 14, there is firmly secured a holder 24 which carries a disk or block 25 of emery, carborundum, or other abradent, and, adjacent the holder, clamping lugs or jaws 26 are formed on the yoke 16 to secure an angle arm 27 which has its free end threaded to receive and adjustably carry a guiding and stop collar or disk 28 and a lock nut 29 by which the disk is locked in a set position on the arm. When the sharpener is to be used, it is removed from the cutter and is held against the knife, the operator moving it along the side of the knife while the abrading disk or block is rapidly rotated by the motor. Generally, the sharpener is applied as shown in Fig. 5, the side of the knife bearing against the end of the abrading disk and the back of the standard resting against the stop collar 28 whereby the grinder will be guided as it is moved up and down along the knife. After one side of the knife has been ground, the other side is treated in the same way, the sharpener being reversed to engage the opposite side of the standard, and both sides of the knife may be ground and an even sharp edge produced very rapidly.

While we prefer to use the device as shown in Fig. 5, the handle 19 may be omitted and the cylindrical casing 7 grasped in the hand to manipulate the tool, Figs. 8, 9 and 10 showing the yoke 16 and the handle 19 omitted, the angle arm 27 being mounted in a special bracket on the cap in Figs. 8 and 9. It may also be desirable sometimes to have the guiding stop collar engage the presser bar instead of the standard and Fig. 9 shows such arrangement, the bracket 30 being of less length than the combined lengths of the abrading disk and its holder and being integral with the cap. It is desirable that the edge of the knife, rest at about the center of the abrading disk and this position is attained by adjusting the angle arm 27 in its support. In Fig. 6, the angle arm 27 is mounted in an extended clamping bracket 31 which projects beyond the abrading disk and has an upturned end portion so that the knife and standard will be engaged in such a manner that the knife will bear against the periphery of the abrading disk instead of its end, the bracket being integral with the yoke. In Fig. 7, the bracket 32, which secures the angle arm, is integral with the yoke but is disposed at an acute angle thereto, this arrangement being especially adapted for grinding a pronounced bevel on the edge of the knife.

In Fig. 8, the bracket 33 is bolted, to the cap 11 and is generally similar to the bracket 31 shown in Fig. 6, the knife being engaged in the same manner as in Fig. 6.

In the form shown in Fig. 10, the previously described angle arm and adjustable guiding stop arm are omitted, and in lieu thereof a long bracket 34 is secured to the cap 11. The outer end of the bracket is upturned and a spindle 35 is secured therein. A holder 36, carrying an abrading disk 37 is loosely mounted on the spindle and is pressed toward the end of the spindle by a spring 38 in an obvious manner, being prevented from passing off the spindle by a flange 39, as shown. It will be noted that the axis of the abrading disk 37 is at an angle to the axis of the disk 25 and that the lower marginal portions of the disks are in contact so that the motion of the disk 25 will be transmitted to the disk 37 and the knife edge inserted between the disks will be simultaneously ground on both sides. The disk 37 by its engagement with the far face of the knife serves as a guide for the tool as well as a sharpening element.

It will be noted, that in the several forms of device, the guide 28 is adjustable along its supporting arm, and the arm is rotatably and reciprocably adjustable in its clamp, thus providing a universal adjustment to accommodate any and all conditions of use.

It will be obvious, that the bottom edge 4b of the knife may be ground in a manner similar to the vertical edge 4a, by simply raising the knife 4b to its uppermost position and applying the grinder. The guide will, of course, be suitably adjusted.

From the foregoing description, taken in connection with the accompanying drawings, it will be seen that we have provided a highly efficient portable self-contained motor-driven tool. It must be understood that while the tool is intended primarily for sharpening the knives of cloth-cutting machines, it is well adapted for sharpening all edge tools, and scissors and shears may be sharpened as well as straight knives.

What we claim as new and desire to secure by Letters Patents of the United States is:—

1. A portable grinding tool comprising a casing, a motor therein, an abrading member at one end of the casing driven directly by the motor, a ventilating cap over said end of the casing, a yoke secured over the cap and constructed at one end to be mounted on a cutting machine and having a handle at the opposite end, and a guide element carried by the yoke and cooperating with the abrading member as the latter is moved along a knife which is to be sharpened.

2. A portable grinding tool comprising a casing, a motor therein, an abrading member at one end of the casing driven directly by the motor, a yoke secured over said end of the casing and spanning the motor shaft, a clamp on said yoke, an angle arm adjustably secured in said clamp, and a collar adjustably mounted on said arm for holding the abrading member to a knife which is to be sharpened as the latter is moved along the knife.

3. A portable grinder for cloth cutting machines having a knife and a guide therefor, comprising a motor casing, a motor therein, an abrading member at one end of the casing driven directly by the motor, and an angle arm adjustably mounted on said casing and having a stop collar adjustably supported thereby, said collar being engageable with the knife guide for guiding the abrading member along the knife.

4. A portable grinding tool for cloth cutting machines of the type having a standard, and a knife reciprocable along said standard, comprising a casing, a motor therein, an abrading member at one end of the casing driven by the motor, a ventilating cap over said end of the casing, a yoke secured over the cap and constructed at one end for mounting on the machine and having a handle at the opposite end, and a guide element carried by the yoke adapted for engagement with said standard, thereby to guide the abrading member as the latter is moved along said knife to sharpen same.

5. A portable grinding tool for cloth cutting machines of the type having a standard and a knife reciprocable in said standard comprising a motor casing, an abrading member at one end thereof, a yoke secured about said casing, a clamp on said yoke, an angle arm adjustably secured in said clamp and a collar adjustably mounted on said arm for engagement with said standard, thereby to hold the abrading member against the knife as the member is moved along the knife to sharpen same.

6. A portable grinding tool for cloth cutting machines comprising a grinding wheel and a guide comprising an arm extending from the casing and across an end thereof and having a stop collar shaped to conform to a portion of the machine, adjustably supported thereon, means to mount said guide for universal adjustment and movement relative to said wheel, said guide being engageable with said machine to position the wheel with respect to the cutting member of the machine.

7. A portable grinding tool comprising a casing, a motor therein, an abrading element at one end of the casing driven directly from the motor, a bracket projecting from the casing, an angle arm adjustably mounted thereon, adjacent the abrading element, and a stop collar adjustably mounted on said arm, effective to guide the abrading element as the latter is moved along a knife which is to be sharpened.

8. A grinder for the reciprocatory knife of a cloth cutting machine of the type having a base, and an upstanding standard supporting working parts thereof, and serving as a guide for said knife, comprising a casing, a power driven grinding wheel carried thereby, and a guide engageable with said standard, comprising an L-shaped member adjustably mounted on said casing and having an adjustably mounted collar thereon shaped to conform to said standard.

9. A grinder for power driven cloth cutters of the type including a knife having a substantially horizontal cutting edge and a second cutting edge angularly disposed to said first edge, comprising a power driven sharpener for the knife, and a casing therefor, means to guide the sharpener along said cutting edges during the sharpening operation, comprising an L-shaped member adjustably mounted on said casing and having an adjustably mounted stop collar adapted to engage the cloth cutter, and a common source of power for said cutter and said sharpener.

10. A portable grinding tool for cloth cutting machines of the type having a reciprocating knife and a guide therefor, comprising a motor casing, a motor therein, an abrading element at one end thereof and driven by the motor, an angle arm mounted adjacent the abrading element and a guide collar adjustably mounted on said arm to cooperate with the abrading element, and to engage the knife guide on the cutting machine and position the abrading element for movement along the knife thereby to sharpen the same.

11. A portable grinding tool for cloth cutting machines of the type having a standard and a knife reciprocable along said standard, comprising a motor casing, and support, a motor in said casing, an abrading member at one end thereof driven by the motor, a yoke secured to said casing, an angle arm carried by the yoke and extending across an end of the casing for guiding engagement with the standard, thereby to guide the abrading member as the latter is moved along the knife to sharpen same, and a collar adjustably mounted on said angle arm, effective to determine the relative angular position of the tool and knife.

12. A portable grinding tool for cloth cutting machines of the type having a knife and a guide therefor, comprising a carrier and an abrading member, a yoke mounted on said carrier, an angle arm adjustably mounted on said yoke, and a stop collar adjustably mounted on said arm, said collar being shaped to cooperate with said guide thereby to properly position said abrading member relative to said knife.

In testimony whereof we hereunto affix our signatures.

JACOB BLOCH.
ALBERT G. WAGNER.